US005509447A

United States Patent [19]

Kane

[11] Patent Number: 5,509,447

[45] Date of Patent: Apr. 23, 1996

[54] 2/2 DIRECTIONAL SEAT VALVE

[75] Inventor: Brian Kane, Budenheim, Germany

[73] Assignee: Mannesmannufer Aktiengesellschaft, Düsseldorf, Germany

[21] Appl. No.: 267,774

[22] Filed: Jun. 28, 1994

[30] Foreign Application Priority Data

Jun. 28, 1993 [DE] Germany .......................... 43 21 832.6

[51] Int. Cl.$^6$ .......................................................... F16K 1/38

[52] U.S. Cl. ...................... 137/625.34; 251/324; 251/368

[58] Field of Search .................................... 251/324, 368; 137/625.33, 625.34

[56] References Cited

U.S. PATENT DOCUMENTS

| | | | |
|---|---|---|---|
| 572,297 | 12/1896 | Hennebohle | 137/625.34 X |
| 2,692,614 | 10/1954 | McLeod | 251/324 X |
| 4,570,585 | 2/1986 | Hayashi | 251/368 X |
| 4,621,656 | 11/1986 | Achimarn | 251/368 X |
| 4,786,031 | 11/1988 | Waldrop | 251/368 |

FOREIGN PATENT DOCUMENTS

| | | | |
|---|---|---|---|
| 3436193 | 4/1986 | Germany . | |
| 4135865 | 5/1993 | Germany . | |
| 648908 | 4/1985 | Switzerland . | |
| 8805130 | 7/1988 | WIPO | 29/890.12 |
| 90/02280 | 3/1990 | WIPO | 251/318 |

OTHER PUBLICATIONS

Der Hydraulik Trainer; Grundlagen und Komponenten der Fluidtechnik Hydraulik, Exner et al.; pp. 1, 203 and 204.

*Primary Examiner*—John C. Fox

*Attorney, Agent, or Firm*—Cohen, Pontani, Lieberman, Pavane

[57] ABSTRACT

Disclosed is a 2/2 directional seal valve with direct control comprising a housing and a seat piston installed, i.e., located, in leakproof and slidable manner in the housing. The piston has a conical surface which acts together with a seating surface located in the housing to open and close a passageway for passing pressure medium therethrough. A closing spring is also provided. One end of the closing spring bears against the housing and another end of the closing spring bears against the seat piston. In order to achieve a valve of this type which, while functioning in a leakage-free manner, has a low weight and is especially suitable for use in aircraft hydraulics. The seat piston comprises a high-strength carbon-fiber-reinforced plastic and the housing comprises light metal or a light metal alloy.

9 Claims, 2 Drawing Sheets

2/2 DIRECTIONAL SEAT VALVE

BACKGROUND OF THE INVENTION

1. Field of the Invention

The present invention relates to a 2/2 directional seat valve with direct control. More particularly the present invention relates to a 2/2 directional seat valve comprising a housing and a seat piston.

2. Discussion of the Prior Art

The concept of directional valves encompasses all valves which are employed to control the starting, stopping and changing of the direction of the volumetric flow of a pressure medium. The designations of directional valves are based on the number of utility connections and the number of controller positions. Thus, a valve with two utility connections and two controller positions is designated a 2/2 directional valve. Based on their design, a distinction is made between directional slide valves, directional seat valves and rotary slide valves. The basic design of a directional seat valve is described in the Hydraulic Trainers' Book, Volume 1, "Principles and Components of Fluid Technology, Hydraulics" ("*Grundlagen und Komponenten der Huidtechnik, Hydraulik*") (October 1991, p. 203ff). The seat valve typically includes a housing, a seat piston, and a closing spring. The closing spring pushes the seat piston to seat in a seat area within the housing to seal the valve. For high-pressure applications, the seat valves usually include housings and seat pistons made of steel. Thus, for example, a 4/4 directional value consisting of four 2/2 directional seat valves becomes very heavy in terms of weight, which is a great disadvantage for use in aircraft construction.

It has already been suggested that the housing be made of light metal or a light metal alloy and the known seat pistons of steel be arranged therein. Attempts have shown that it is not possible to do this, or only possible with complications, because the pairing of steel and light metal in the area of the seal seating leads to cold taps or the premature wearing out of the seating. In both situations, the area relationships change as a result, so that the force of the closing spring is not sufficient to balance the increasing counter-force. As a result of this, leakages develop. One possible solution is to provide the area of the seating in the light-metal housing with a steel covering. However, this is very expensive to design and manufacture.

SUMMARY OF THE INVENTION

An object of the present invention is to provide a 2/2 directional seat valve for the high-pressure range of greater than 200 bar that weighs less than valves of the existing prior art.

It is another object of the present invention to provide a 2/2 directional seat valve which functions in a leakproof manner and is especially suitable for use in aircraft hydraulics.

These objects are attained with a 2/2 directional seal valve with direct control comprising a housing, a seat piston and a closing spring. The seat piston comprises a high-strength carbon-fiber-reinforced plastic and the housing comprises light metal or a light metal alloy. The housing defines a housing bore and comprises a seating surface located therein. The seat piston has a first end and a second end and is slidably installed in the housing bore. Typically, a leakproof seal is provided between the seat piston and housing to seal the housing bore in the vicinity of the first end of the seat piston. A conical surface is provided at the second end of the seat piston. The conical surface and the seating surface are configured to releasably engage with each other to open and close the valve. One end of the closing spring bears against a surface within the housing and another end of the closing spring bears on the seat piston. Preferably the conical surface of the seat piston has a surface area of less than 3 $mm^2$ and the seat piston comprises a piston guide for guiding said seat piston. The piston guide extends along a portion of the seat piston to a location adjacent the conical surface. Preferably a groove within the housing separates the piston guide from the conical surface.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, where similar reference characters denote similar elements throughout the several views.

DETAILED DESCRIPTION OF THE PREFERRED EMBODIMENTS

According to the valve of the present invention, a seat piston made of a high-strength carbon-fiber-reinforced plastic, i.e., polymer, is located in a known housing made of light metal or a light metal alloy. Advantageously, the plastic has a tensile strength greater than 240 $N/mm^2$. In order to permit the surface pressure for the pairing of plastic and light metal to be precisely determined, the valve provides a seal seating limited to an area of less than 3 $mm^2$. In other words, the valve provides conical seal seating having a radial extension of less than 0.1 min. However, this small seal seating makes it urgently necessary that the seat piston be accurately guided.

To accomplish this guidance, the valve includes three arms installed 60 degrees apart with recesses between them so that the flow of the pressure medium is not obstructed. For small seal pistons, the recesses are limited in cross-section by a secant. For large seat pistons, i.e., those with relatively large volumetric throughput of the pressure medium, the recess is limited in cross-section by a curve segment lying at the center. Advantageously, this curve segment is the segment of a circular arc because this is simply produced in terms of manufacturing technology. So that the seat piston cannot tilt during its axial slide, the arms provided for guidance extend to near the conical seating. So that no disruptive edge is formed in the transition area between the arm and the conical area of the seat piston, preferably a groove is provided in this transitional area. The contour of the groove is designed such that the groove passes smoothly into the area of the conical seating of the seat piston. This arrangement has the advantage that play needed for the movement of the seat piston within the bore of the housing is not hindered by a raised edge. Such an edge could also result in the seal seating wearing out prematurely.

The 2/2 directional seat valve is described in more detail in reference to the embodiment shown in FIGS. 1–4.

Figure 1:
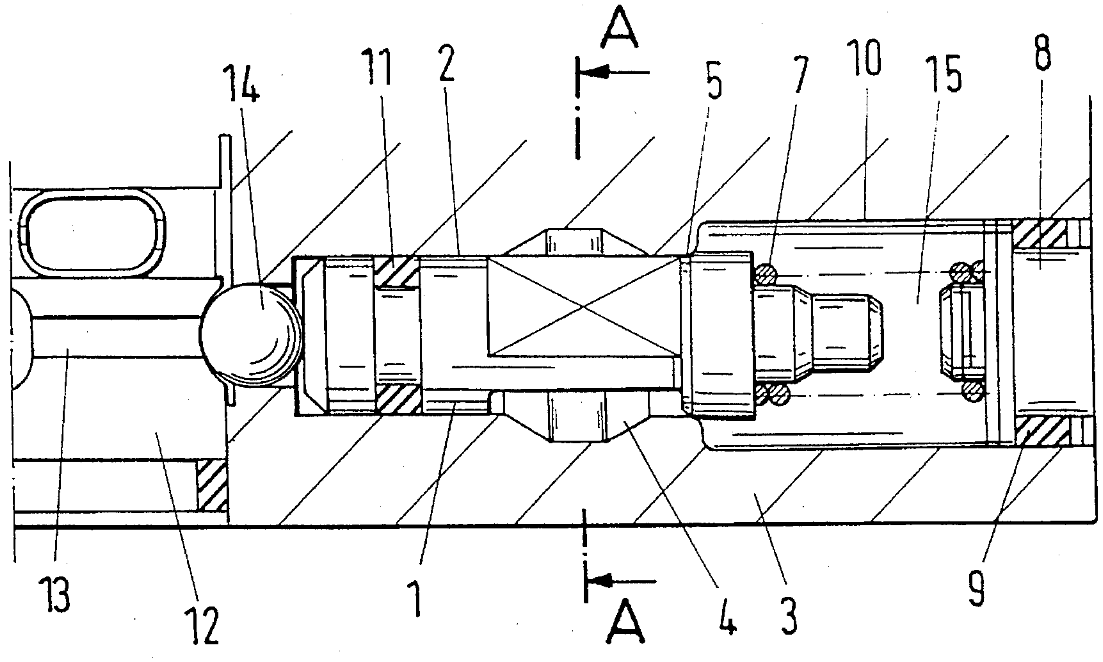
FIG. 1 illustrates a longitudinal section view of a 2/2 directional seat valve according to the present invention.

FIG. 1 illustrates, in longitudinal cross-section, a 2/2 directional seat valve according to the invention, which is manually operated. Alternatively, the valve can be controlled by electrical or hydraulic means (not shown). The valve of the present invention includes a seat piston 1 which is made of a carbon-fiber-reinforced plastic. The seat piston is installed in a leakproof seal 11 and installed so as to slide axially in a bore 2 of a housing 3. The housing 3 is made of light metal or a light metal alloy. In the bore 2 there ends a centrally-located inflow channel 4 for passing pressure medium to the bore 2 of the valve. The bore 2 leads through a cylindrical intermediate section into a seating surface, i.e., area, 5 of the housing 3. This seating surface 5 functions together with a corresponding conical surface 6 of the seat piston 1 (derails shown in FIG. 4) to control flow of the pressure medium from the bore 2 to a housing bore section 10 having a relatively larger inner diameter. A closing spring 7 is also provided. One end of the closing spring 7 bears against the seat piston 1 and another end of the closing spring bears against an adaptor 8. The adaptor 8 is placed in a leakproof seal 9 in the housing bore section 10.

Figure 2:
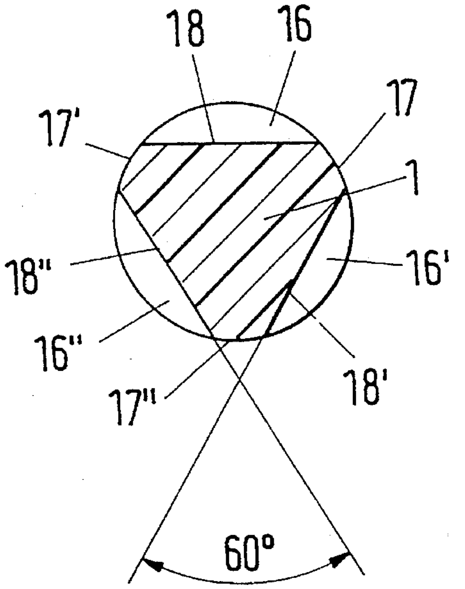
FIG. 2 illustrates a cross-sectional view of a guide area of the seat piston along Line A—A of FIG. 1.

The activation of the 2/2 directional seat valve occurs in this embodiment via a manually rotatable camshaft 12, which is depicted in part in FIG. 1. Through a contoured recess 13 in the camshaft 12, a cam constructed as a ball 14 is activated and the seat piston 1 is pushed to the right and thus the obstruction to the flow of the pressure medium is removed. As FIG. 2 shows the valve of this embodiment has recesses 16, 16', 16". These recesses 16, 16', 16" are provided in the area of the inflow channel 4 and the seating surface 5 so that the pressure medium can flow unobstructed from the inflow channel 4 to an adjacent space 15. The recesses 16, 16', 16" are distributed symmetrically around the perimeter, whereby the seat piston 1 is guided by means of arms 17, 17', 17" arranged 60 degrees apart as seen in FIG. 2. These arms 17, 17', 17" contact the housing 3 and extend along a portion of the seat piston 1 to the vicinity of the conical surface 6 of the seat piston 1. The arms 17, 17', 17" ensure a precise central guidance of the seat piston 1 without the flow of the pressure medium being hindered. Given the small contact surface in the area of the seal formed by the seating surface 5 and conical surface 6 (less than 0.1 mm in radial extension and less than 3 $mm^2$ expressed as an area), it is necessary for the seat piston 1 to be guided accurately. Any tilt, regardless of how slight, will result in leakages, particularly in view of the use of high-pressure medium passing through the valve.

Figure 3:
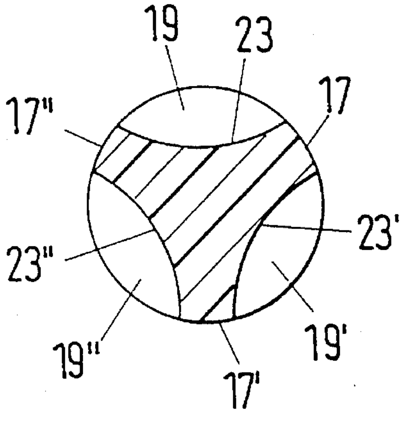
FIG. 3 illustrates a cross-sectional view of another embodiment of the guide area of the seat piston.

In the simplest form, a limit, i.e., side of a cross-section of the recesses 16, 16', 16" as depicted in FIG. 2, is a secant 18, 18', 18". In the event of larger dimensions for the 2/2 directional seat valve and thus of larger volumetric flows it is necessary to provide the recesses 19, 19', 19", as shown in FIG. 3, having a larger cross-section relative to recesses 16, 16', 16" This is accomplished, with the arms of roughly equal size 17, 17', 17", by providing a limit, i.e., side, 23, 23', 23" for the cross-section of each of the recesses 19, 19', 19" which is curved inwardly. These curve segments 23, 23', 23" are typically portions of an arc to simplify production.

Figure 4:
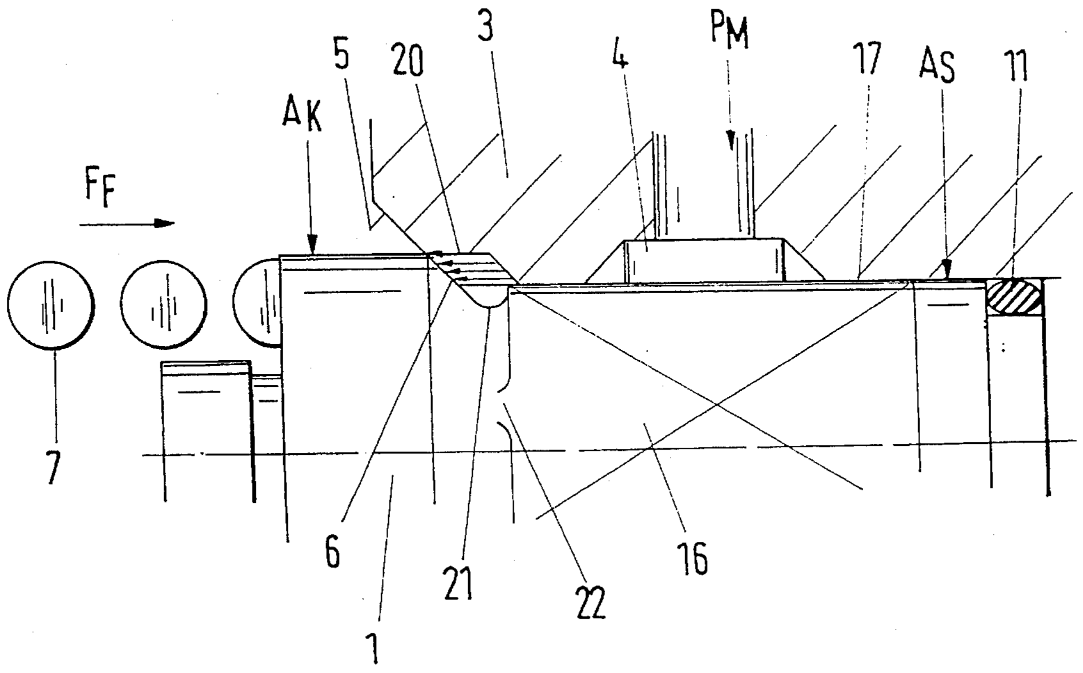
FIG. 4 illustrates a schematic diagram of a portion of the valve of FIG. 1 depicting area and force relationships on the seat piston.

FIG. 4 is a schematic view in enlarged scale of a partial longitudinal section of the 2/2 directional seat valve according to the invention. The view provided by FIG. 4 is oriented 180 degrees relative to the view of FIG. 1. For the seat piston 1 to be held in the closed position, the following condition must be met:

$$F_{spring} > P_{medium}(A_{piston} - A_{seat})$$

Expressed in words: The spring force ($F_F$ of FIG. 4) must be equal to or greater than the force represented by the product arrived at by multiplying the pressure of the medium ($P_M$ of FIG. 4) by the difference in the cross-sectional areas of the piston ($A_K$ of FIG. 4) and the seat ($A_S$ of FIG. 4). The area difference is indicated by arrows 20, wherein the arrows 20 point in a direction opposite to the spring force. This also shows that the force resulting from the pressure of the pressure medium opposes the spring force of the closing spring 7. FIG. 4 also shows that the arm 17 does not pass smoothly into the conical surface 6 of the seat piston 1, but rather is interrupted by a groove 21. The advantage of this is that the seat piston 1 can move freely within play resulting from manufacturing tolerances for seat piston 1 and bore 2 of the housing, without the conical surface 6 being subjected though all edge to premature wear in the sensitive seal area where conical surface 6 contacts seating surface 5. The contour of the groove 21 is so chosen that it passes smoothly into the conical surface 6 of the seat piston 1. The conical surface 6 usually has an angle of about 45 degrees. Ill contrast to arm 17, the recess 16, which is limited in terms by the secant 18, extends as a curved area 22 into the seal area, wherein the curved area 22 ends just below the start of the conical surface 6.

The invention is not limited by the embodiments described above which are presented as examples only but can be modified in various ways within the scope of protection defined by the appended patent claims.

What is claimed is:

1. A 2/2 directional seat valve with direct control comprising:

a housing, said housing defining a housing bore and comprising a seating surface located therein, said housing having a pressure medium inlet perpendicular to the housing bore;

a seat piston slidably installed in the housing bore, said seat piston having a first end and a second end, said seat piston comprising a conical surface at the second end thereof, the conical surface and the seating surface being configured to releasably engage with each other, said seat piston having a reduced cross-sectional area in a region of the pressure medium inlet;

means for forming a leakproof seal between said seat piston and said housing bore in the vicinity of the first end of the seat piston;

a closing spring arranged within said housing so that one end of said closing spring bears against said housing and the other end of said closing spring bears on said seat piston;

wherein said seat piston comprises a high-strength carbon-fiber-reinforced plastic and a piston guide for guiding said seat piston, the piston guide extends along a portion of said seat piston to a location adjacent the conical surface, and said housing comprises a material selected from the group consisting of light metal and a light metal alloy, said seat piston and said housing define three recesses therebetween and the piston guide comprises three arms placed 60 degrees apart with the recesses between the arms, and extend axially over the region of the pressure medium inlet.

2. The 2/2 directional seat valve of claim 1, wherein the conical surface of the seat piston has a surface area of less than 3 $mm^2$.

3. The 2/2 directional seat valve of claim 1, wherein each recess has an end which contacts the conical surface.

4. The 2/2 directional seat valve of claim 1, wherein each recess has a cross-section and the cross-section has a side which is a secant.

5. The 2/2 directional seat valve of claim 1, wherein each recess has a cross-section and the cross-section has a side which is a curved segment.

6. The 2/2 directional seat valve of claim 5; wherein the curved segment has a shape of a circular arc.

7. The 2/2 directional seat valve of claim 1, wherein a transitional area is provided between the arms and the conical surface as a groove which extends smoothly into the conical surface.

8. The 2/2 directional seat valve of claim 1, wherein the groove is defined by said housing.

9. The 2/2 directional seat valve of claim 1, wherein said seat piston has a tensile strength greater than 240 $N/mm^2$.

* * * * *